United States Patent [19]

Sasaki et al.

[11] Patent Number: 4,458,987
[45] Date of Patent: Jul. 10, 1984

[54] MULTI-LAYER LIQUID CRYSTAL PANEL WITH SEALING MEMBERS AND RETAINERS IN REGISTRATION

[75] Inventors: Ken Sasaki; Sigeru Matsuyama; Masamitsu Naoi; Noboru Hoshino; Masaharu Koyama, all of Mobara, Japan

[73] Assignee: Hitachi, Ltd., Tokyo, Japan

[21] Appl. No.: 286,073

[22] Filed: Jul. 23, 1981

[30] Foreign Application Priority Data

Jul. 23, 1980 [JP] Japan ................................. 55-99972

[51] Int. Cl.³ ............................................. G02F 1/133
[52] U.S. Cl. ..................................... 350/335; 350/344
[58] Field of Search ........................ 350/344, 343, 335

[56] References Cited

U.S. PATENT DOCUMENTS 3,903,519  9/1975  Zega ................................ 350/335 X
3,990,781  11/1976  Gum ................................... 350/343
4,165,157  8/1979  Kobale et al. ...................... 350/344
4,222,635  9/1980  Jülke ............................... 350/344 X
4,260,224  4/1981  Takayama ......................... 350/335
4,283,119  8/1981  Hoffman ........................... 350/344

Primary Examiner—John K. Corbin
Assistant Examiner—David Lewis
Attorney, Agent, or Firm—Antonelli, Terry & Wands

[57] ABSTRACT

A multi-layer liquid crystal panel for a liquid crystal display device having stacked light transmitting substrates of different sizes is disclosed. A retainer is disposed at a position directly beneath a sealing member which seals a first substrate and a second substrate, between the second substrate and a third substrate. The retainer is applied to the substrates simultaneously with the application of the sealing member. The first, second and third substrates are stacked one on the other and pressed to form a multi-layer panel. By virtue of the retainer, the gaps between the respective substrates are maintained uniform over the display area.

11 Claims, 10 Drawing Figures

MULTI-LAYER LIQUID CRYSTAL PANEL WITH SEALING MEMBERS AND RETAINERS IN REGISTRATION

BACKGROUND OF THE INVENTION

The present invention relates to a multi-layer liquid crystal panel, and more particularly to a multi-layer liquid crystal panel which can maintain a constant separation between substrates of different sizes arranged to oppose each other.

In a known multi-layer liquid crystal panel for use in a liquid crystal watch which simultaneously displays an analog quantity and a digital value or a multi-layer liquid crystal device which displays in two or more colors, substrates of different sizes are stacked and terminals for connecting electrodes are arranged on the substrates. In such a multi-layer liquid crystal panel, a first substrate and a second larger substrate are stacked one upon the other by sealing material applied on a periphery of the first substrate. On the portion of the second substrate which does not face the first substrate, there are arranged a series of electrode terminals for connecting the electrodes arranged on the substrates to an external circuit. A third substrate which is larger than the second substrate is also provided with a series of electrode terminals at a portion which does not face the second substrate. In this manner the connection of the multi-layer liquid panel and the external circuit is facilitated and assured. However, since the position of the sealing material for the first and second substrates is displaced from the sealing material for the second and third substrates, the spacings between the substrates may vary when the first to third substrates are stacked one on the other and a pressure is applied to the stacked substrates to form the multi-layer liquid crystal panel. Accordingly, a multi-layer liquid crystal panel having a uniform spacing cannot be produced.

SUMMARY OF THE INVENTION

It is an object of the present invention to provide a multi-layer liquid crystal panel which maintains a constant spacing between the substrates of different sizes which are arranged to oppose to each other.

The multi-layer liquid crystal panel of the present invention has at least three light transmitting substrates of different sizes. A first substrate and a second substrate which is larger than the first substrate are stacked one on the other by a first sealing material applied on a periphery of the first substrate. The second substrate and a third substrate which is larger than the second substrate are stacked by a second sealing material which is applied on a periphery of the second substrate. A retainer is disposed in a gap between the second substrate and the third substrate at the position facing the first sealing material in order to maintain the constant spacing between the substrates.

DESCRIPTION OF THE PREFERRED EMBODIMENTS

In order to facilitate the understanding of the multi-layer liquid crystal panel of the present invention, the prior art multi-layer liquid crystal panels are first explained with reference to the drawings.

Figure 1A:
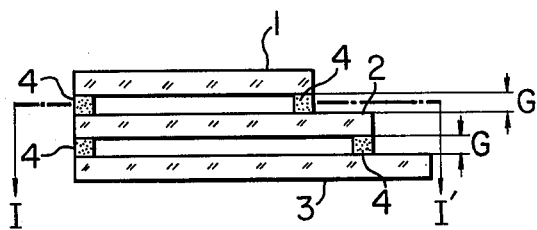
FIGS. 1A and 1B show a longitudinal sectional view and a plan view including a section taken along a line I—I' in FIG. 1A, respectively, of a prior art multi-layer liquid crystal panel.
Figure 1B:
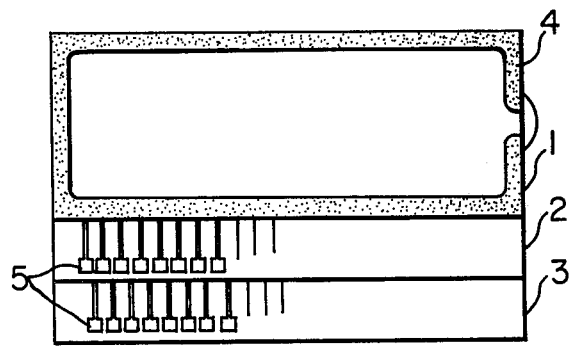

FIG. 1A shows a sectional view of a prior art two-layer liquid crystal panel and FIG. 1B shows a plan view thereof including a section taken along a line I—I' in FIG. 1A.

In FIGS. 1A and 1B, numerals 1, 2 and 3 denote upper, middle and lower light transmitting substrates, respectively, having transparent electrodes, not shown, deposited on their opposing surfaces. The peripheries of the upper, middle and lower substrates 1, 2 and 3 are sealed by sealing material 4 including spacers, and liquid crystals are sealed in the gaps therebetween to form the two-layer liquid crystal panel. Numeral 5 denotes a series of electrode terminals arranged at stepped areas of the substrates 2 and 3 to connect the transparent electrodes arranged on the substrates to an external circuit.

Figure 2:
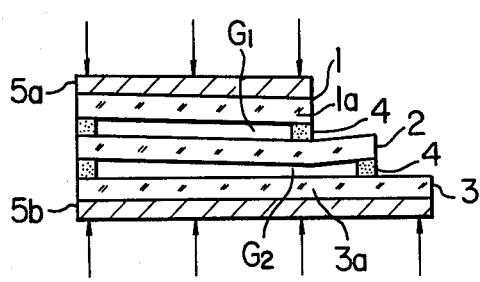
FIG. 2 shows a longitudinal sectional view for illustrating disadvantages in the multi-layer liquid crystal shown in FIGS. 1A and 1B.

In the liquid crystal panel of the construction described above, a pressure is applied in the direction of an arrow as shown in FIG. 2 with flat plates 5a and 5b being disposed on the outer surfaces of the upper substrate 1 and the lower substrate 3 in order to make uniform a gap $G_1$ between the upper substrate 1 and the middle substrate 2 and a gap $G_2$ between the middle substrate 2 and the lower substrate 3. In this case, the same pressure is applied to an end 1a of the upper substrate 1 and a portion 3a of the lower substrate 3 which faces the end 1a of the upper substrate 1. The substrates each has a thickness of 10 $\mu$m, for example, and the middle substrate 2 is bent toward the lower substrate 3 as shown in FIG. 2 when the pressure is applied. As a result, the gap $G_2$ tends to decrease at the portion 3a of the lower substrate 3 while the gap $G_1$ tends to increase at the end 1a of the upper substrate 1. Thus, the liquid crystal panel having the uniform substrate spacing is not obtained.

Figure 3:
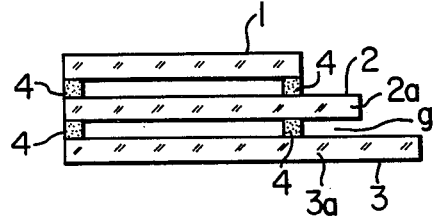
FIG. 3 shows a longitudinal sectional view of another prior art multi-layer liquid crystal.

A liquid crystal panel which aims to overcome the above difficulty is shown in FIG. 3. As seen from FIG. 3, the sealing member 4 between the middle substrate 2 and the lower substrate 3 is disposed directly below the sealing member between the upper substrate 1 and the middle substrate 2 so that a mechanical strength of the liquid crystal panel is maintained. In the structure of the liquid crystal panel shown in FIG. 3, however, a gap g is formed between the middle substrate 2 and the lower substrate 3. Since the gap g has a distance of 10 μm, for example, if the liquid crystal, a cleaning agent or washing water penetrates into the gap g, it is very difficult to remove it. When such a liquid crystal panel is placed in a high temperature and high humidity environment, water droplets remain in the gap g. Since the terminals 5 for the transparent electrodes are arranged on the end 2a of the middle substrate 2 and the end 3a of the lower substrate 3 as described above, the water droplets remaining in the gap g may erode the terminals or create leakage currents across the terminals. The sealing member 4 is deteriorated by the water droplets to reduce the reliability of the liquid crystal panel. Furthermore, the liquid crystal panel may be contaminated by particles which penetrate into the gap g.

Figure 4A:
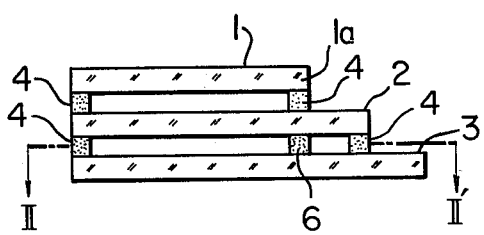
FIGS. 4A and 4B show a longitudinal sectional view and a plan view including a section taken along a line II—II' in FIG. 4A, respectively, of a multi-layer liquid crystal panel in accordance with one embodiment of the present invention.
Figure 4B:
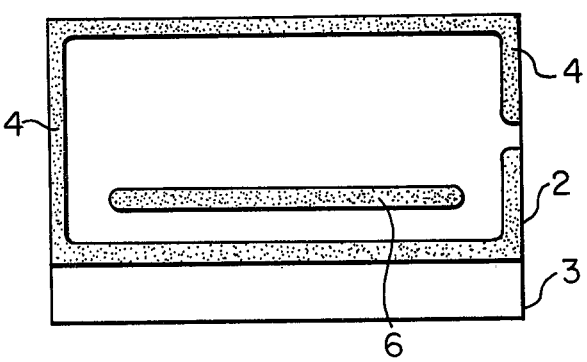
Figure 7:
FIG. 7 is an enlarged plan view of the retainer of FIG. 4B illustrating spacers of rod shaped glass fibers dispersed therein.

The present invention provides a liquid crystal panel which overcomes the disadvantages described above. FIGS. 4A and 4B show one embodiment of the multi-layer liquid crystal panel of the present invention. In FIGS. 4A and 4B, a retainer 6 is disposed in a gap between the middle substrate 2 and the lower substrate 3 at a position facing i.e., in registration with the seal member 4 which seals the upper substrate 1 and the middle substrate 2 at the end 1a of the upper substrate 1. The retainer 6 is made of the same material as the sealing member. The retainer 6 may be formed by screen-printing epoxy an sealing agent or a low melting point glass having spacers of rod-shaped glass fibers of 10 μm diameter and 50 μm length dispersed therein as shown in enlarged view in FIG. 7, on the substrate simultaneously with the application of the sealing member 4. The spacers are effective to maintain the constant spacing of the substrates but they are not always necessary. The ends of the retainer 6 are not coupled to opposite sides of the sealing member 4. If the ends of the retainer 6 were coupled to opposite sides of the sealing member 4 to form an area surrounded by the sealing member 4 and the retainer 6, the area would establish a space closed by the middle substrate 2 and the lower substrate 3. As a temperature rises, air in the closed space goes out of the space through the sealing member by the expansion of the air in the closed space. As a result, the sealing member would be broken. Thus, as shown, the retainer is spaced from and surrounded by the sealing member and together with the sealing member delimits areas between the substrates which are in communication with one another.

In accordance with the structure of the present liquid panel structure, no gap is formed between the middle substrate 2 and the lower substrate 3, which gap would permit external contaminant to enter, and the difficulty encountered in controlling the gaps in the example of FIG. 2 is overcome. Thus, uniform gaps G are formed between the upper substrate 1 and the middle substrate 2 and between the middle substrate 2 and the lower substrate 3.

Figure 5:
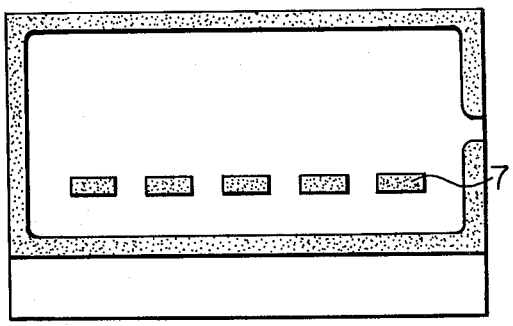
FIG. 5 shows a plan view of a modification of a retainer.
Figure 8:
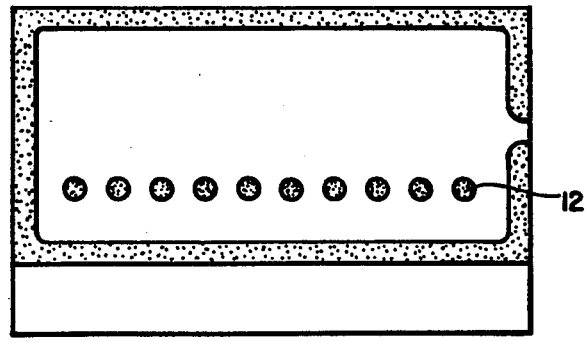
FIG. 8 shows a plan view of a modification of a retainer.

In the present embodiment, the shape of the retainer 6 made of the same materials the sealing member 5 need not be restricted to continuous linear shape. It may be discontinuous in the form of a broken-line-shaped retainer 7 shown in FIG. 5 or a dot-shaped retainer 12 shown in FIG. 8. A width of the retainer 6 is preferably equal to or larger than the width of the sealing member 4 from a standpoint of strength required for the retainer.

Figure 6:
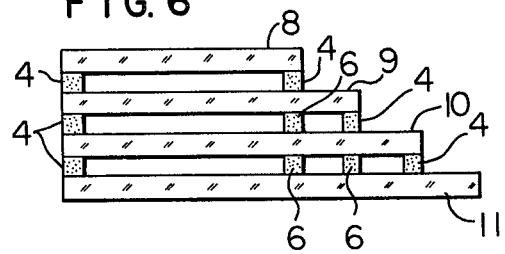
FIG. 6 shows a longitudinal sectional view of the multi-layer liquid crystal panel in accordance with another embodiment of the present invention.

By utilizing the two-layer liquid crystal panel of the present embodiment, a liquid crystal watch which can simultaneously display an analog quantity and a digital value or various types of multi-color displays which use different dyes in each liquid crystal layer can be provided. The present invention can provide a multi-layer liquid crystal panel such as three-layer or four-layer liquid crystal panel. FIG. 6 shows a structure of a three-layer liquid crystal panel having four substrates in accordance with another embodiment of the present invention. Numerals 8–11 denote light transmitting substrates. Its displays could be in cyan, magenta and yellow by choosing appropriate dyes contained in the liquid crystal layers between the respective substrates.

As described hereinabove, according to the present invention, the gaps between the respective substrates are maintained uniform over the display area. Sufficient pressing force in pressing the stacked substrates during manufacturing procedures can be applied without damaging the display cell. A yield is, therefore, improved.

We claim:

1. A multi-layer liquid crystal panel comprising liquid crystal layers between at least three light transmitting substrates including a first substrate, a second substrate larger than said first substrate and a third substrate larger than said second substrate, a sealing member arranged between the periphery of said first substrate and said second substrate for sealing the periphery of said first substrate with respect to said second substrate, a sealing member arranged between the periphery of said second substrate and said third substrate for sealing the periphery of said second substrate with respect to said third substrate, and a retainer disposed between said second substrate and said third substrate at a position in registration with a portion of said sealing member arranged between the periphery of said first substrate and said second substrate so as to maintain a uniform spacing between said second substrate and said third substrate, said retainer being spaced from and surrounded by said sealing member arranged between the periphery of said second substrate and said third substrate.

2. A multi-layer liquid crystal panel according to claim 1, wherein said retainer is made of a material selected from low melting point glass or an epoxy sealing agent.

3. A multi-layer liquid crystal panel according to claim 2, wherein spacers are dispersed in the material of said retainer.

4. A multi-layer liquid crystal panel according to claim 3, wherein said spacers are rod-shaped glass fibers.

5. A multi-layer liquid crystal panel according to claim 1, wherein said retainer is a continuous member having a linear shape.

6. A multi-layer liquid crystal panel according to claim 1, wherein said retainer is a discontinuous member having a broken-line shape.

7. A multi-layer liquid crystal panel according to claim 1, wherein said retainer is a discontinuous member having a dot shape.

8. A multi-layer liquid crystal panel according to claim 1, wherein said retainer extends in a direction substantially parallel to a portion of said sealing member disposed between the periphery of said second substrate and said third substrate and together with said sealing member arranged between the periphery of said second substrate and said third substrate delimits areas between said second substrate and said third substrate which are in communication with one another.

9. A multi-layer liquid crystal panel according to claim 1, further comprising a fourth substrate larger than said third substrate, a sealing member arranged between the periphery of said third substrate and said fourth substrate for sealing the periphery of said third substrate with respect to said fourth substrate, and first and second retainers being disposed between said third substrate and said fourth substrate, said first and second retainers being spaced from and surrounded by said sealing member arranged between the periphery of said third substrate and said fourth substrate, said first retainer being disposed at a position in registration with a portion of said sealing member arranged between the periphery of said second substrate and said third substrate, and said second retainer being disposed at a position in registration with a portion of said sealing member arranged between the periphery of said first substrate and said second substrate.

10. A multi-layer liquid crystal panel according to claim 9, wherein said second retainer is disposed at a position in registration with a portion of said retainer disposed between said second substrate and said third substrate.

11. A multi-layer liquid crystal panel according to claim 1, wherein said retainer is formed of a material of said sealing member.

* * * * *